Patented Mar. 27, 1934

1,952,313

UNITED STATES PATENT OFFICE 1,952,313

COMPOSITIONS OF MATTER AND METHOD AND STEPS OF MAKING AND USING THE SAME

Mortimer T. Harvey, East Orange, N. J., assignor to The Harvel Corporation, a corporation of New Jersey No Drawing. Application November 6, 1930, Serial No. 493,919

15 Claims. (Cl. 260—3)

The present invention relates to compositions made of cashew nut shell liquid and casein and to methods and steps for making and using the compositions. The compositions of the invention are useful as adhesives, water proofing, electrical insulation, molded composition, are infusible when set and have additional characteristics and advantages which will be apparent from the following description of the invention.

When a solution of casein and water is mixed with cashew nut shell liquid, together with a setting material for the latter, a heavy viscous emulsion is produced which has a high degree of adhesiveness; and which can be set to various degrees of toughness or hardness, depending upon the setting material used and upon the time and temperature of setting.

In making an emulsion or mixture of cashew nut shell liquid and casein, the latter is first put in solution in water with the aid of an alkali such as sodium hydroxide, sodium carbonate, potash or other alkali in a manner well known; and there is dissolved in the cashew nut shell liquid a setting material such, for example, as formaldehyde, paraformaldehyde, furfuraldehyde, hexamethylenetetramine, or an alkali such as caustic soda or potash, lime, barium hydroxide or the like. The setting material can be added to the cashew nut shell liquid either before, with or after the addition of the casein.

The cashew nut shell liquid used can either be the raw cashew nut shell liquid or cashew nut shell liquid modified by heat or some chemical to thicken the same. Suitable chemicals are those noted above for setting materials for the cashew nut shell liquid.

An example of the method of making an adhesive according to the invention follows: One part of hexamethylenetetramine is dissolved in about 10 parts by weight of cashew nut shell liquid at about 120° F. to 140° F., the latter having previously thickened by heating up to a temperature about 600° F. About 20 parts of casein and about 2 parts sodium carbonate are dissolved in 100 parts by weight of water. Substantially equal portions by weight of the cashew nut shell liquid-hexamethylenetetramine mixture and of the casein solution are thoroughly mixed together and let to stand for several hours. The resulting mixture is an emulsion which has a high degree of adhesiveness and which can be thinned to the desired consistency for application by the addition of water. When applied and dried at room temperature the water evaporates and leaves a hard, strong, infusible, water proof binder which has electrical insulating qualities. This adhesive is useful for general purposes and particularly for holding together laminations of wood, paper or cloth.

To the cashew nut hexamethylenetetramine casein emulsion described, there can be added fillers such as cord, wood flour, slate dust, or other well known and equivalent fillers for making a molded composition which can be cold pressed and dried and cured with the aid of heat. Various degrees of hardness in the final product can be obtained by using either the raw cashew nut shell liquid or cashew nut shell liquid which has been modified to the various degrees of thickness as above described, the compositions made with raw cashew nut shell liquid being somewhat flexible and those made with the thickened cashew nut shell liquid having a greater degree of hardness and stiffness in proportion to the degree of thickening of the cashew nut shell liquid used. The time and temperature of curing or setting also determines the degree of hardness of the final product. A good setting temperature is, for example, 270° F. for 6 hours which will give a hard, infusible composition. The time and temperature of heat may be varied above or below these figures to secure harder or softer compositions.

In the above examples, the proportion of hexamethylenetetramine to cashew nut shell liquid can be varied either way to give various degrees of hardness with a given time and temperature of setting; the proportion of alkali to casein is not fixed and can be varied; the equivalents of the hexamethylenetetramine can be used in about the same proportions; and the proportion of casein solution to cashew nut shell liquid can be varied to get different degrees of adhesiveness, hardness and so on, all within the skill of one acquainted in this art.

Having thus described my invention, what I claim and wish to protect by Letters Patent is:

1. A composition in which cashew nut shell liquid and casein are associated with an alkaline material reactive with casein to form an alkaline caseinate.

2. A composition comprising heat treated cashew nut shell liquid, casein and an alkaline material reactive with casein to form an alkaline caseinate.

3. The product of reaction of cashew nut shell liquid and an alkaline caseinate.

4. The product of reaction of cashew nut shell liquid and an alkaline caseinate with the aid of heat.

5. The reaction product of an alkaline caseinate, cashew nut shell liquid and formaldehyde.

6. The reaction product of an alkaline caseinate, cashew nut shell liquid and a material selected from the group consisting of formaldehyde, paraformaldehyde, furfuraldehyde, and hexamethylenetetramine.

7. The method which comprises reacting cashew nut shell liquid and an alkaline caseinate.

8. The method which comprises reacting an alkaline caseinate, cashew nut shell liquid and a material selected from the group consisting of formaldehyde, paraformaldehyde, furfuraldehyde, and hexamethylenetetramine.

9. The method which comprises reacting casein, an alkali, and cashew nut shell liquid.

10. The method which comprises reacting an alkaline caseinate, cashew nut shell liquid and a material selected from the group consisting of formaldehyde, paraformaldehyde, furfuraldehyde and hexamethylenetetramine with the aid of heat.

11. The method which comprises reacting casein, an alkali, and cashew nut shell liquid with the aid of heat.

12. The method which comprises heat treating cashew nut shell liquid and mixing with casein under alkaline conditions.

13. The method which comprises heating cashew nut shell liquid up to about 600° F., and mixing with casein under alkaline conditions.

14. The method which comprises heating cashew nut shell liquid up to about 600° F. and subjecting it to the action of casein and formaldehyde under alkaline conditions.

15. The method which comprises heating cashew nut shell liquid up to about 600° F. and reacting with hexamethylenetetramine and casein under alkaline conditions.

MORTIMER T. HARVEY.